(12) United States Patent
Fujitani et al.

(10) Patent No.: US 9,787,234 B2
(45) Date of Patent: Oct. 10, 2017

(54) DRIVE CONTROLLER OF INSTRUMENT

(71) Applicant: MINEBEA CO., LTD., Kitasaku-gun, Nagano (JP)

(72) Inventors: Sakae Fujitani, Hamamatsu (JP); Nobuyuki Sueyoshi, Kosai (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/093,220

(22) Filed: Apr. 7, 2016

(65) Prior Publication Data

US 2016/0301343 A1 Oct. 13, 2016

(30) Foreign Application Priority Data

Apr. 9, 2015 (JP) ................................. 2015-079909

(51) Int. Cl.
*H02P 8/18* (2006.01)
*H02P 8/02* (2006.01)

(52) U.S. Cl.
CPC . *H02P 8/18* (2013.01); *H02P 8/02* (2013.01)

(58) Field of Classification Search
CPC ......................................................... H02P 8/18
USPC ................................... 318/696, 34
See application file for complete search history.

(56) References Cited

U.S. PATENT DOCUMENTS

| | | | | |
|---|---|---|---|---|
| 5,689,159 A | * | 11/1997 | Culp | A61C 1/0015 318/400.18 |
| 7,129,670 B2 | * | 10/2006 | Oishi | H02P 8/40 318/587 |
| 7,446,493 B2 | * | 11/2008 | Forster | H02K 11/33 318/400.22 |
| 8,730,025 B2 | * | 5/2014 | Hiroe | G01D 13/28 116/288 |

FOREIGN PATENT DOCUMENTS

JP 09-145742 A 6/1997

* cited by examiner

*Primary Examiner* — David S Luo
(74) *Attorney, Agent, or Firm* — Carrier Blackman & Associates, P.C.; Joseph P. Carrier; Jeffrey T. Gedeon

(57) ABSTRACT

A drive controller of an instrument controls a stepping motor to rotate a pointer of the instrument attached to a rotation shaft of the stepping motor, the pointer rotatable between a zero scale position and a maximum scale position. The drive controller controls the stepping motor to perform a sweeping operation in which the pointer is swung from the zero scale position to the maximum scale position and returned back to the zero scale position, wherein the drive controller controls the stepping motor, during the sweeping operation, to accelerate to a predetermined speed by outputting a rated torque signal to the stepping motor and controls the stepping motor to rotate at the predetermined speed by outputting a decreased torque signal to the stepping motor, the decreased torque signal being lower than the rated torque signal.

18 Claims, 8 Drawing Sheets

DRIVE CONTROLLER OF INSTRUMENT

BACKGROUND OF THE INVENTION

1. Field of the Invention

The present invention relates to a drive controller that controls a pointer used in an instrument such as a vehicle speedometer, a tachometer, or any other instrument.

2. Description of the Related Art

In paragraph "0021" of JP-A-H09(1997)-145742, it is described that "a sweeping operation can be performed without generating the pulsation of a pointer without performing a detailed step operation, a sweeping operation not causing a driver to feel discomfort can be acquired, and the marketability and the designability of a cross coil-type instrument can be improved". In addition, in paragraph "0003", it is described that "by performing a sweeping operation in which, after the ignition switch is turned on, the pointer of a cross coil-type instrument such as a speedometer, a tachometer, or the like is operated in a full scale from the initial state and then is returned to the initial state, the sweeping operation is considered to improve the marketability and the designability", and, in paragraph "0004", it is described that "when a sweeping operation is performed depending on driving torque supplied from the above-described driving processing unit operating a cross coil-type instrument at a normal time, the driving torque is high, and thus, the pointer overshoots for an instructed electric angle (stepping operation), and there is a problem in that the pulsation is generated in the operation of the pointer so as to cause the driver to feel discomfort".

In vehicle instruments of recent years, stepping motors are used instead of the cross coil that is described above. A stepping motor used in a vehicle instrument requires torque higher than dynamic friction torque of a constant-speed period at the time of performing a sweeping operation so as to satisfy the acceleration, the resistance against vibration, and the like of the pointer in a normal operation.

The period of a sweeping operation is configured by an acceleration period, a deceleration period, and a constant-speed period. In a case where a motor is driven with the same torque as that at the time of performing a normal operation during the constant-speed period of the sweeping operation, the smoothness is degraded due to excessive torque, and the pulsation may be easily generated in the operation of the pointer, whereby the driver is caused to feel discomfort. In addition, in a case where a motor is driven at a speed near its vibration resonance point (resonance frequency) in the constant-speed period, the pulsation tends to be more remarkable.

SUMMARY OF THE INVENTION

One of objects of the present invention is to provide a drive controller of an instrument that does not cause a user such as a driver and an operator to feel discomfort in accordance with the motion of a pointer in a sweeping operation.

According to an illustrative embodiment of the present invention, there is provided a drive controller of an instrument that controls a stepping motor to rotate a pointer of the instrument attached to a rotation shaft of the stepping motor, the pointer rotatable between a zero scale position and a maximum scale position. The drive controller controls the stepping motor to perform a sweeping operation in which the pointer is swung from the zero scale position to the maximum scale position and returned back to the zero scale position, wherein the drive controller controls the stepping motor, during the sweeping operation, to accelerate to a predetermined speed by outputting a rated torque signal to the stepping motor and controls the stepping motor to rotate at the predetermined speed by outputting a decreased torque signal to the stepping motor, the decreased torque signal being lower than the rated torque signal.

DETAILED DESCRIPTION

Hereinafter, embodiments of the present invention will be described in detail with reference to the drawings.

Figure 1:
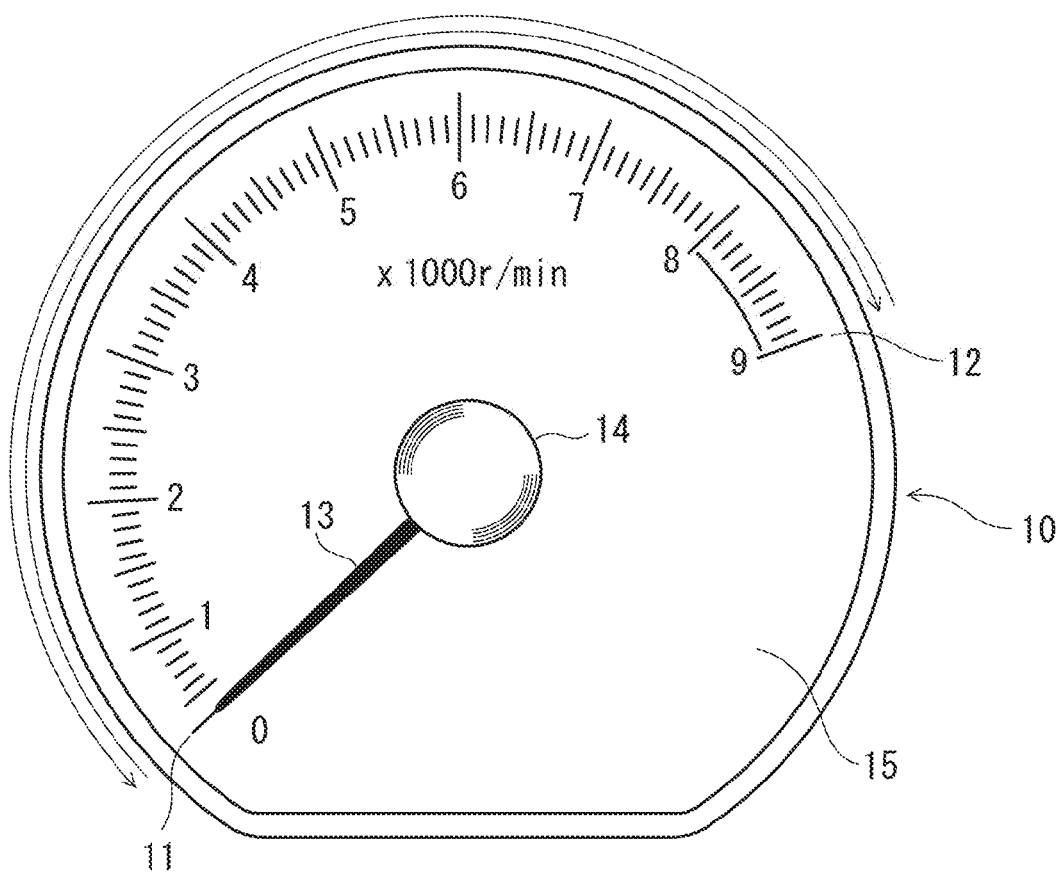
FIG. 1 is an external view that illustrates an example of a vehicle instrument.

FIG. 1 is an external view that illustrates an example of a vehicle instrument 10.

The vehicle instrument 10 represents an example of a tachometer having an approximately circular shape and is configured to include a rotation shaft 14 disposed at the center of an instrument panel 15 and a pointer 13 disposed at the rotation shaft 14. The pointer 13 is configured to indicate any arbitrary position between a zero scale position 11 and a maximum scale position 12 due to a motor 120 that is described later. An arrow illustrated in FIG. 1 represents the direction of a sweeping operation of the pointer 13.

When an ignition switch of the vehicle is turned off, the pointer 13 of the vehicle instrument 10 indicates the zero scale position 11. When the ignition switch of the vehicle is turned on, the pointer 13 rotates to indicate the maximum scale position 12 and thereafter, is returned to the zero scale position 11. This is called as a sweeping operation. The sweeping operation will be described in detail with reference to FIG. 3 to be described later. This sweeping operation is merely a simulated operation, and there is no relation between a position indicated by the pointer and the actual rotation speed of the engine.

Figure 2:
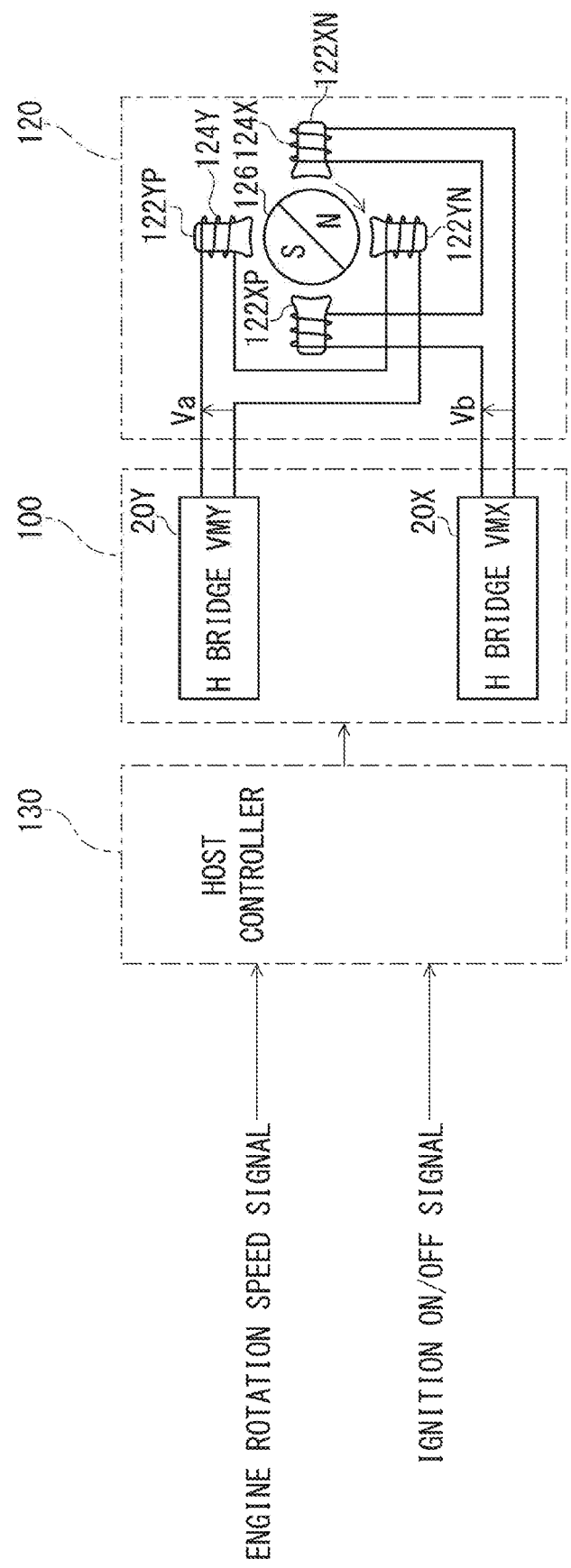
FIG. 2 is a schematic configuration diagram that illustrates a drive controller of a vehicle instrument.

FIG. 2 is a schematic configuration diagram that illustrates a drive controller 100 that drives the pointer 13 of the vehicle instrument 10 to rotate.

The drive controller 100 is controlled by a host controller 130 and rotates the pointer 13 of the vehicle instrument 10 by driving the motor 120 and constantly indicates a position representing an appropriate engine rotation speed, whereby a driver can recognize the actual rotation speed of the engine.

The host controller 130 detects a current rotation speed of the engine (not illustrated in the drawing) by using an engine rotation speed signal and performs control of the rotation position of the motor 120 such that the rotation speed is indicated by the pointer 13 of the vehicle instrument 10. In addition, in a case where the ignition switch of the vehicle is detected to be On according to an ignition On/Off signal, the host controller 130 outputs an instruction signal for causing the motor 120 to perform a sweeping operation to the drive controller 100.

The drive controller 100 includes H bridge circuits 20X and 20Y. The drive controller 100 outputs a drive voltage Vb from the H bridge circuit 20X and outputs a drive voltage Va from the H bridge circuit 20Y based on an instruction signal supplied from the host controller 130, thereby appropriately selecting a motor driving system according to an operation purpose of the motor 120 and driving the motor. In addition, in a case where pointer indicating resolving power is necessary as an instrument, it is necessary to perform driving through micro step driving that is electrically finely divided until the resolving power can be assured.

When a position instruction signal for causing the motor 120 to perform a normal operation is input from the host controller 130, the drive controller 100 outputs drive voltages Va and Vb for rotating the motor 120 to a designated position. On the other hand, when an instruction signal for causing the motor 120 to perform a sweeping operation is input, the drive controller 100 outputs drive voltages Va and Vb for causing the motor 120 to perform a sweeping operation.

The motor 120 is a bipolar-type two-phase stepping motor and includes a rotor 126 that includes a permanent magnet and is disposed to be freely rotatable and stators that are disposed at positions of four equal divisions in the circumference direction on the periphery of the rotor 126 through a minute air gap in the diameter direction from the rotor 126. Such stators are configured by stators 122XP and 122XN of a B phase and stators 122YP and 122YN of an A phase. Around each stator, a winding is wound. Here, windings wound around the stators 122YP and 122YN are connected in series, and both the windings together will be referred to as a "coil 124Y" (A phase coil). Similarly, windings wound around the stators 122XP and 122XN are connected in series, and both the windings together will be referred to as a "coil 124X" (B phase coil). Although not clearly illustrated in FIG. 2, the stator 122YP and the stator 122YN are coupled by a magnetic circuit, and this magnetic circuit is configured such that, when an A phase current flows through the A phase coil 124Y, magnetic fields of the A phase direction are added. In addition, similarly, the stator 122XP and the stator 122XN are coupled by a magnetic circuit, and this magnetic circuit is configured such that, when a B phase current flows through the B phase coil 124X, magnetic fields of the B phase direction are added. According to the rotation of this motor 120, the pointer 13 (see FIG. 1) rotates to indicate a predetermined position and can be stopped at the position as is necessary.

Figure 6A:
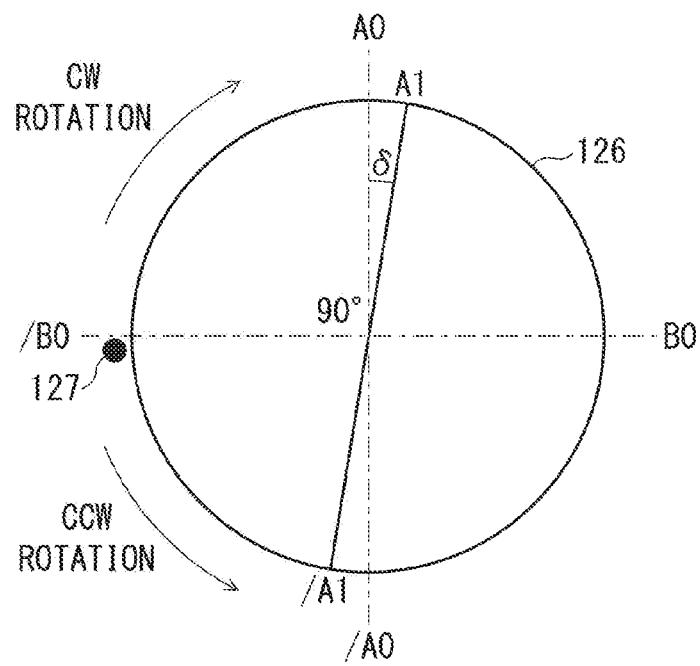
FIGS. 6A and 6B are explanatory diagrams that illustrate the cause of generation of pulsation in drive control of a vehicle instrument.
Figure 6B:
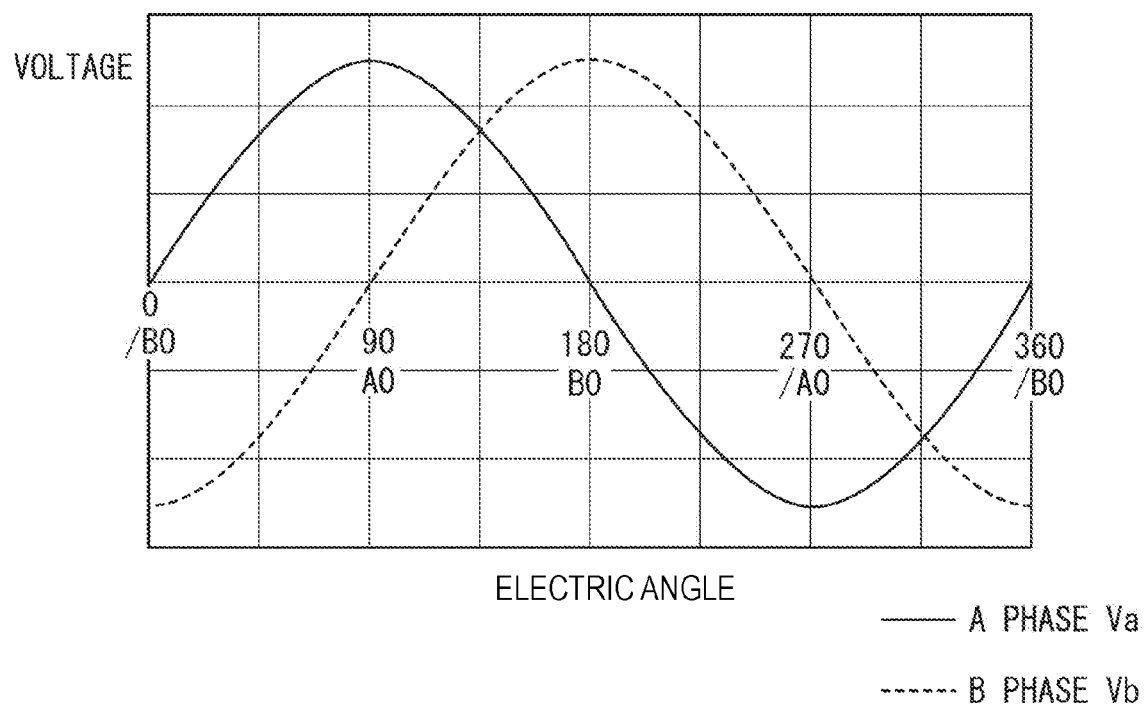

FIGS. 6A and 6B are explanatory diagrams that illustrate the cause of generation of pulsation in drive control of the vehicle instrument 10.

FIG. 6A is an explanatory diagram of the rotation of the motor 120.

FIG. 6A, for the convenience of description, illustrates an electric angle of the motor 120 at the position of the rotor 126 and illustrates the rotation direction thereof. In the motor 120 illustrated in FIG. 2, since the number of rotor magnetic poles is two, the mechanical angle and the electric angle are the same.

A position B0 represents a position corresponding to a direction in which the stator 122XN is disposed, and a position /B0 represents a position corresponding to a direction in which the stator 122XP is disposed. In addition, a position A0 represents an ideal direction in which the stator 122YN is disposed, and a position /A0 represents an ideal direction in which the stator 122YP is disposed. Actually, the stator 122YN is disposed at a position A1 that deviates from the position A0 by a linearity error δ (static angle error). The stator 122YP is disposed at a position /A1 that deviates from the position /A0 by the linearity error δ. The attachment position A1 of the stator 122YN and the attachment position /A1 of the stator 122YP do not represent an intentional deviation but represent a deviation that is allowed during the manufacturing process. A stopper 127 is a pin disposed on the stator side and statically, is a member that performs regulation such that the stopper 127 and a wall (not illustrated in the drawing) disposed on the rotor side are exactly in contact with each other when the rotor 126 is excited at the position /B0.

When the power is off, the motor 120 is at the position /B0, and the pointer 13 (see FIG. 1) indicates the zero scale position 11. As the mechanical operation range, the motor 120 can rotate in a CW direction (clockwise direction) from the position /B0 to the position A0-->the position B0-->the position /A0-->prior to the arrival at the stopper 127 immediately before the position /B0. On the other hand, in a sweeping operation, the pointer 13 moves from the zero scale position 11 to the maximum scale position 12, and thereafter, the motor 120 rotates in a CCW direction (counterclockwise direction) so as to be returned to the position /B0 again, and the pointer 13 is returned to the zero scale position 11 again. Here, the maximum scale position 12 is a design item of the vehicle instrument but is not constant.

FIG. 6B illustrates the waveforms of drive voltages Vb and Va output by the H bridge circuits 20X and 20Y. In the drawing, the vertical axis represents the voltage value, and the horizontal axis represents the electric angle.

The drive voltages Va and Vb are sinusoidal waves of which phases deviate from each other by 90 degrees. Ideally, at a 90-degree deviating angle, the drive voltage Va becomes a maximum, a magnetic forces generated by the stators 122YN and 122YP becomes a maximum, and the torque of the rotor 126 maintains a predetermined value. However, actually, since the position A1 of the stator 122YN and the position /A1 of the stator 122YP deviate from each other by the linearity error δ, torque applied to the rotor 126 pulsates (see FIG. 7B) at a frequency that is twice the rotation frequency. In addition, in order to reversely operate the pointer 13, the order of phases A and B applied to the motor 120 may be changed. In other words, FIG. 6B illustrates a state in which the A phase leads the B phase by 90 degrees, and, in a case where the motor rotates in the CW direction in this state, for rotation in the CCW direction, the A phase may be delayed by 90 degrees with respect to the B phase.

A first cause of the generation of pulsation is the linearity error δ (static angle accuracy) of the motor 120 illustrated in FIG. 6A. The linearity error δ is acquired by digitizing the occurrence of a deviation of the actual rotation angle of the stepping motor from the ideal rotation angle for the drive voltage. In other words, the linearity error may be considered to represent a difference between a theoretical angle indicating value and an actual angle indicating value.

In case of being driven as a vehicle instrument, generally, a stepping motor is excited (see FIG. 6B) by a micro step drive voltage that can be sufficiently regarded as a sinusoidal waveform, and accordingly, it is common that the stiffness torque characteristic (θ-T characteristic) is a sinusoidal wave having no distortion. When drive voltages having a phase difference of an electric angle of 90° and having same amplitude is applied to a two-phase stepping motor, a rotation magnetic field having a constant speed is formed in an air gap. At the time of constant-speed operation of the stepping motor, the rotor 126 that is a rotator configured by a magnet may be regarded as one type of synchronization motor rotating in synchronization with the rotation magnetic field.

For example, as illustrated in FIG. 6B, when the drive voltages Va and Vb are input from an electric angle of 0° until an electric angle of 90°, the rotor 126 rotates (accompanying rotation) at a constant speed from the position /B0 to the position A0 in a state being magnetically sucked by the rotation magnetic field. In other words, in a case where the linearity error δ is zero, the rotation magnetic field does not pulsate. As a result, the torque is constant (having no pulsation), and the motor 120 does not pulsate.

However, in a case where there is a linearity error δ due to a structural factor of the stepping motor 120, the output torque pulsates.

At this time, when the drive voltages are input until an electric angle arrives at 0° to 90°, the motor 120 rotates with the speed changing from the position /B0 to the position A0, and the motor 120 pulsates.

When the current waveform becomes a skewed shape of a sinusoidal wave due to the influence of inductance or a counter electromotive voltage, the stiffness torque characteristic (θ-T characteristic) is also distorted from a sinusoidal wave, and this also becomes a factor for the pulsation of the motor 120.

There are the following causes of the linearity error δ due to a structural factor of the motor 120.

FIGS. 7A to 7C and FIGS. 8A and 8B are graphs that illustrate the causes of the generation of pulsation in a stepping motor. In each graph, the vertical axis represents the generated torque of the stepping motor, and the horizontal axis represents the rotation angle. These graphs are graphs acquired by inputting physical information.

In the explanatory notes, "torque A phase" is torque generated from the coil 124Y (A phase) of the motor 120 and represents the product of the stiffness torque characteristic and an instantaneous current flowing through the A phase coil. In the explanatory notes, "torque B phase" is torque generated from the coil 124X (B phase) of the motor 120 and represents the product of the stiffness torque characteristic and an instant current flowing through the B phase coil. In the explanatory notes, "output torque" represents an output torque characteristic of the motor 120. In FIGS. 7A to 7C and FIG. 8A, cogging torque that is not illustrated is not considered and is assumed to be zero in calculation. In the discussion presented here, it is assumed for the calculation that the current waveforms of currents flowing through the A phase coil and the B phase coil are substantially the same as the drive voltage waveforms, and there is no distortion in the current waveforms.

Figure 7A:
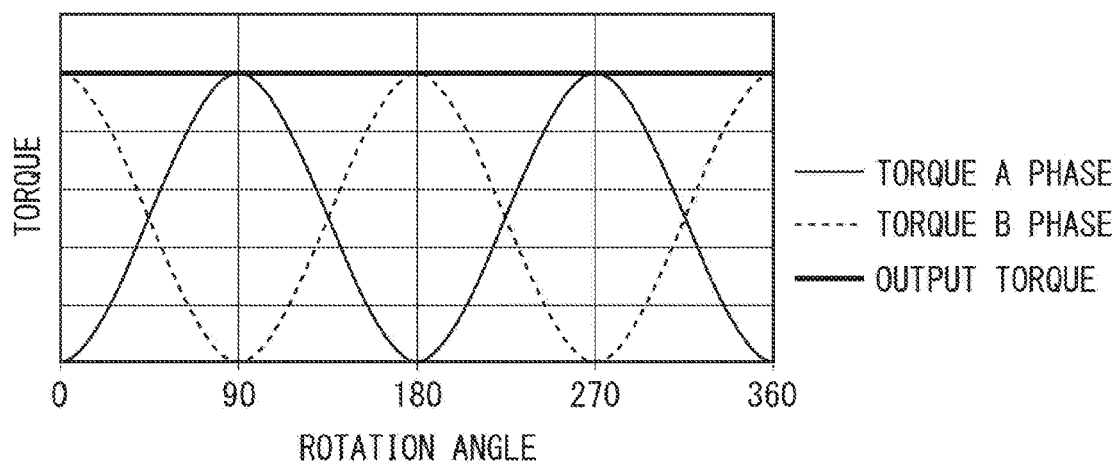
FIGS. 7A to 7C are graphs (calculated value) that illustrate the cause of generation of pulsation in a stepping motor.

FIG. 7A illustrates an ideal example in which the output torque does not pulsate.

As illustrated in this waveform diagram, a torque A phase and a torque B phase are in the form of having an average value that is shifted to the positive side by a maximum value of the sinusoidal wave, and the amplitude values thereof are the same. In addition, the frequency is twice the frequency of the drive voltage, and the phase difference of the torque is an electric angle of 180°. At this time, the output torque (the torque A phase and the torque B phase) of the motor 120 maintains a predetermined constant value. So to speak, this is in a state represented in the following Equation (1). Here, sin θ corresponds to the drive voltage Va of the A phase illustrated in FIG. 6B, and cos θ corresponds to the drive voltage Vb of the B phase.

$$(\sin \theta)^2 + (\cos \theta)^2 = 1 \quad (1)$$

Figure 7B:
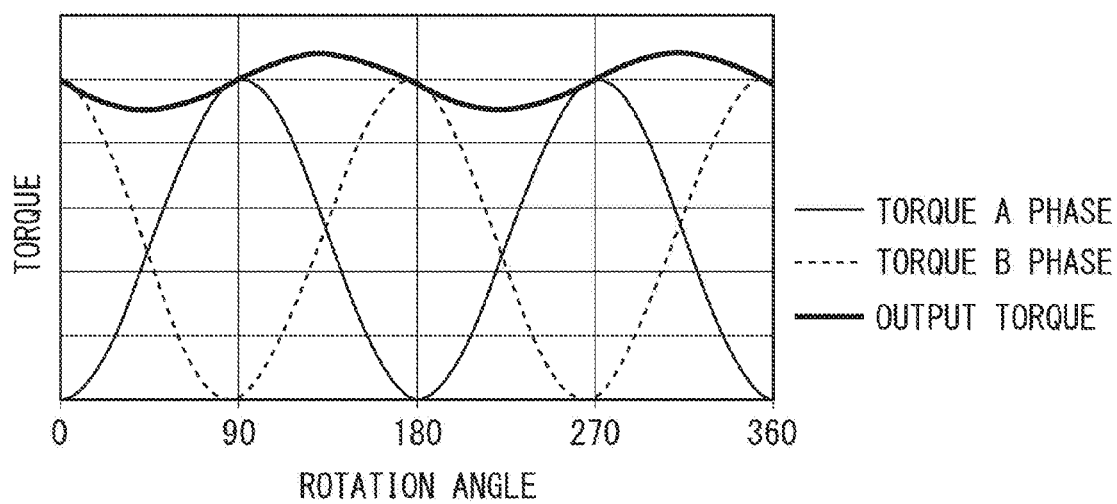

FIG. 7B is a diagram that illustrates a case according to an electric angle deviation between the torque A phase and the torque B phase.

As illustrated in this waveform diagram, while the amplitudes of the torque A phase and the torque B phase are the same, such a phase difference deviates from an electric angle of 180°. At this time, the output torque pulsates.

Figure 7C:
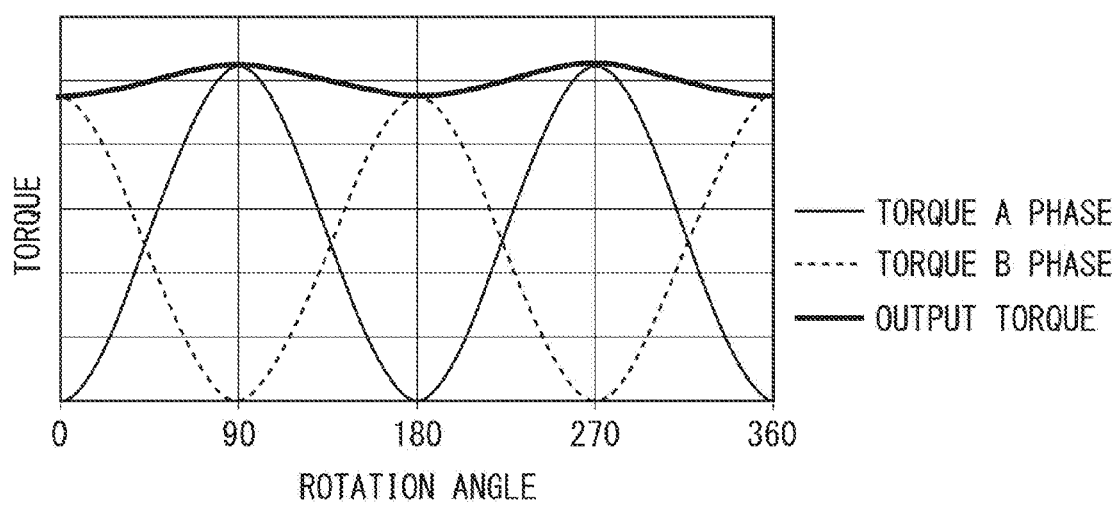

FIG. 7C is a diagram that illustrates a case where the amplitudes of the torque A phase and the torque B phase are different from each other. As illustrated in this waveform diagram, while a phase difference between the torque A phase and the torque B phase is an electric angle of 180°, the amplitudes thereof are different from each other. At this time, the output torque pulsates.

Figure 8A:
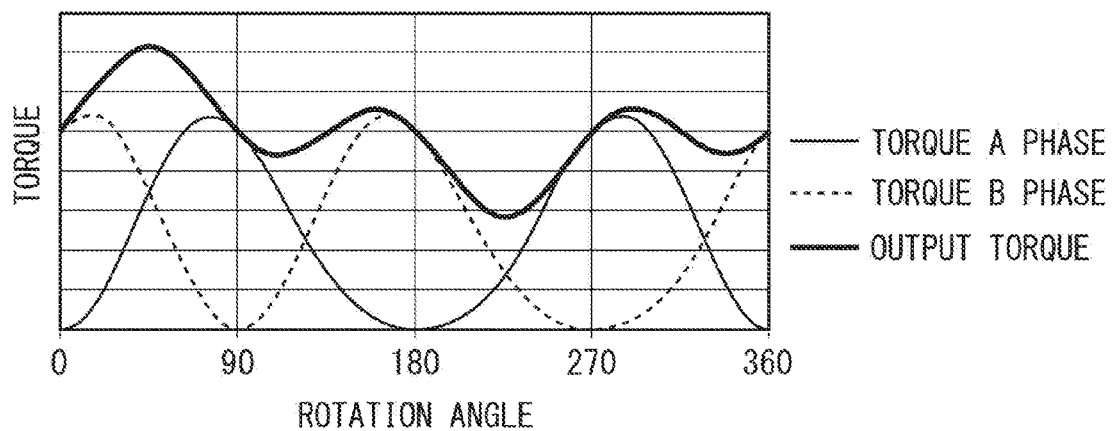
FIGS. 8A and 8B are graphs (calculated value) that illustrate the cause of generation of pulsation in a stepping motor.

FIG. 8A is a diagram that illustrates a case where the stiffness torque characteristic (θ-T characteristic) is distorted, for example, according to the magnetic saturation of a yoke (magnetic circuit).

According to the magnetic saturation of the yoke (magnetic circuit), distortions of the phases or the waveforms of the torque A phase and the torque B phase occur. Here, according to the magnetic saturation, an upper half end of the stiffness torque is larger than a lower half end thereof.

Figure 8B:
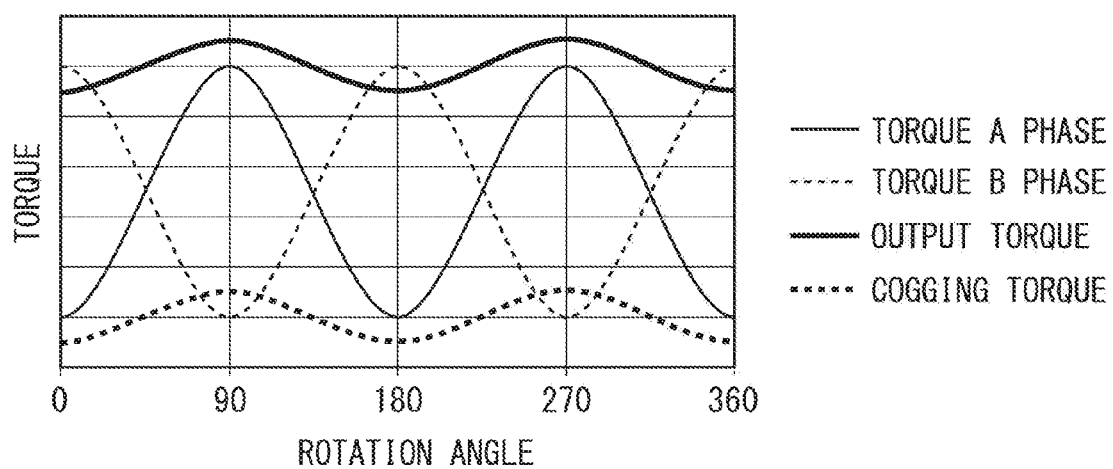

FIG. 8B is a diagram that illustrates a case where the stiffness torque characteristic (θ-T characteristic) is distorted from a sinusoidal wave, for example, according to cogging torque.

The cogging torque is magnetic torque applied between a stator in a non-excitation state and a rotor 126 (magnet) that is generated due to a magnetic flux density distribution on the surface of the rotor 126, a pole-teeth shape of the rotor 126 and the stator, and the processing precision of the other parts. Since the cogging torque varies when the rotor 126 rotates, it may cause a problem. A component changed according to the position of the rotor 126 may be regarded as an external disturbance. This external disturbance overlaps with torque generated by the motor and becomes a factor causing torque variations.

Figure 3:
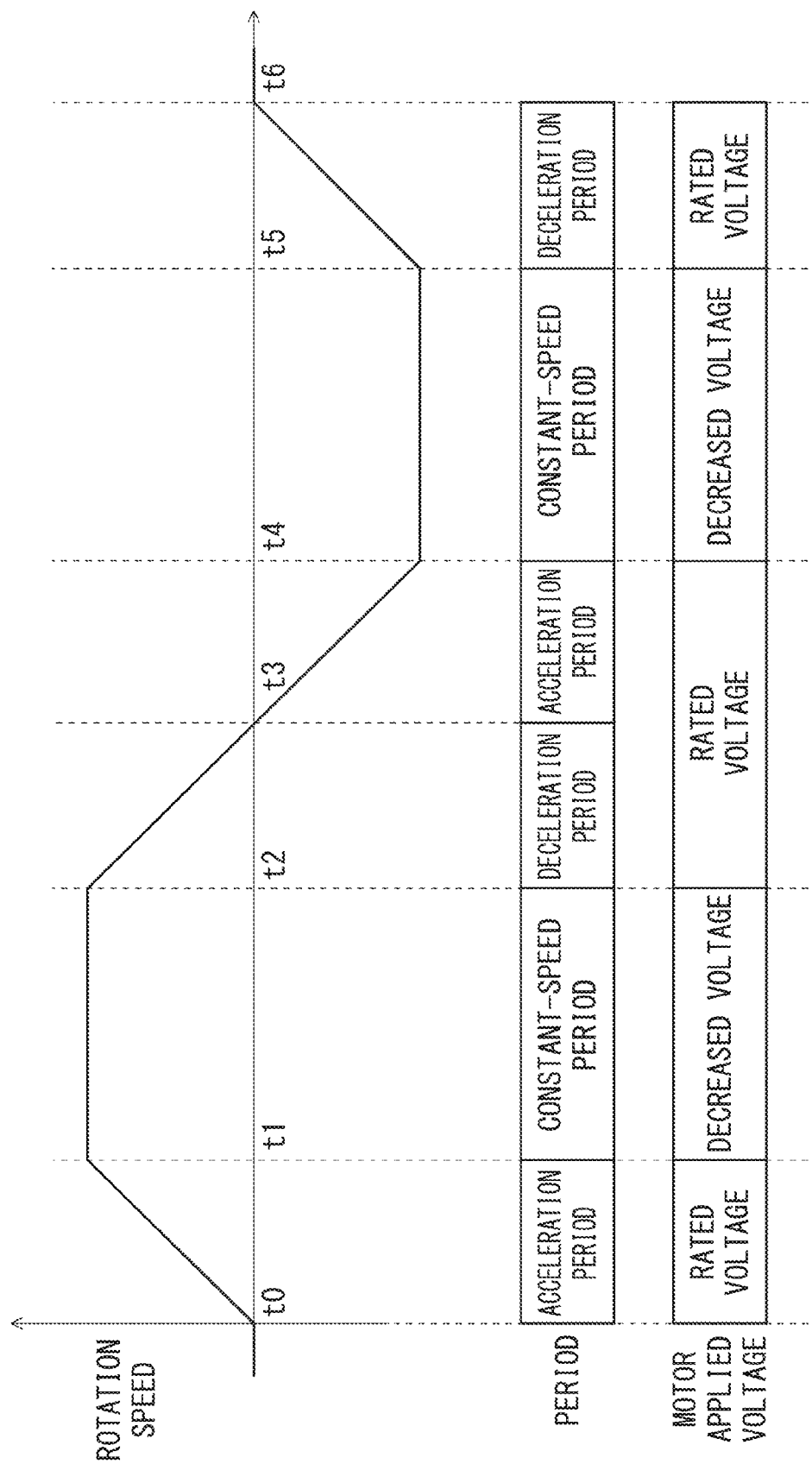
FIG. 3 is a diagram that illustrates a sweeping operation.

FIG. 3 is a diagram that illustrates a sweeping operation according to the embodiment.

The sweeping operation includes a series of operations of time t0 to t6. Here, the rotation speed is defined to be positive at the time of CW rotation and to be negative at the time of CCW rotation. While not described in detail, before the sweeping operation, a pointer resetting operation for reliably setting the pointer 13 to the zero scale position 11 may be performed. In a stepping motor, the position of the pointer before electric conduction cannot be determined. However, the position immediately before the sweeping operation can be reliably set to the zero scale position 11 by this resetting operation no matter what a position at which the pointer 13 immediately before the sweeping operation stops is.

At time t0, the pointer 13 indicates the zero scale position 11. At this time, the motor 120 starts CW rotation and accelerates up to a predetermined speed. A voltage applied to the motor during this acceleration period is a rated voltage (rated torque signal).

At time t1, when the motor 120 is accelerated up to a predetermined speed, thereafter, the motor 120 is rotated at a constant speed, and the pointer 13 is rotated at a constant speed. A voltage applied to the motor during this constant-speed period is a decreased voltage (decreased torque signal) that is lower than the rated voltage. Here, the decreased voltage applied to the motor 120 is preferably in a slew range of the motor 120.

At time t2, the motor 120 decelerates such that the pointer 13 stops at the maximum scale position 12. Here, it is preferable that an excessive amount (overshoot amount) from the maximum scale position 12 of the pointer 13 is decreased as possibly as can. A voltage applied to the motor during this deceleration period is the rated voltage.

At time t3, the pointer 13 indicates the maximum scale position 12 and is stopped. At this time, the motor 120 starts CCW rotation and accelerates up to a predetermined speed. A voltage applied to the motor during this acceleration period is the rated voltage (rated torque signal).

At time t4, when the motor 120 is accelerated up to a predetermined speed (CCW rotation), thereafter, the motor 120 is rotated at a constant speed, and the pointer 13 is rotated at a constant speed. A voltage applied to the motor during this constant-speed period is a decreased voltage (decreased torque signal) that is lower than the rated voltage. Here, the decreased voltage applied to the motor 120 is preferably in the slew range of the motor 120.

At time t5, the motor 120 decelerates such that the pointer 13 stops at the zero scale position 11. A voltage applied to the motor at this time is the rated voltage.

Then, at time t6, the motor 120 is stopped, and the pointer 13 stops at the zero scale position 11. In this way, a series of sweeping operations ends.

The drive controller 100, by setting the drive voltages Va and Vb of the motor 120 to a decreased voltage having a voltage value smaller than the rated voltage, decreases the torque of the stiffness torque characteristic generated in each phase, thereby decreasing the absolute value of the torque variation of the output torque. Accordingly, the pulsation of the motor 120 is decreased.

As a method of generating a decreased voltage lower than the rated voltage, the following two methods may be considered.

A first method is a method in which the amplitude of the drive voltages Va and Vb is set to be lower than the rated voltage in an analog manner. In the first method, the amplitude of the drive currents that are applied to the A-phase and B-phase as torque signals may be set to be lower than the rated current in an analog manner. A second method is a method in which the drive voltages Va and Vb are pulse-modulated. Here, the second method will be described with reference to FIGS. 4 and 5.

Figure 4:
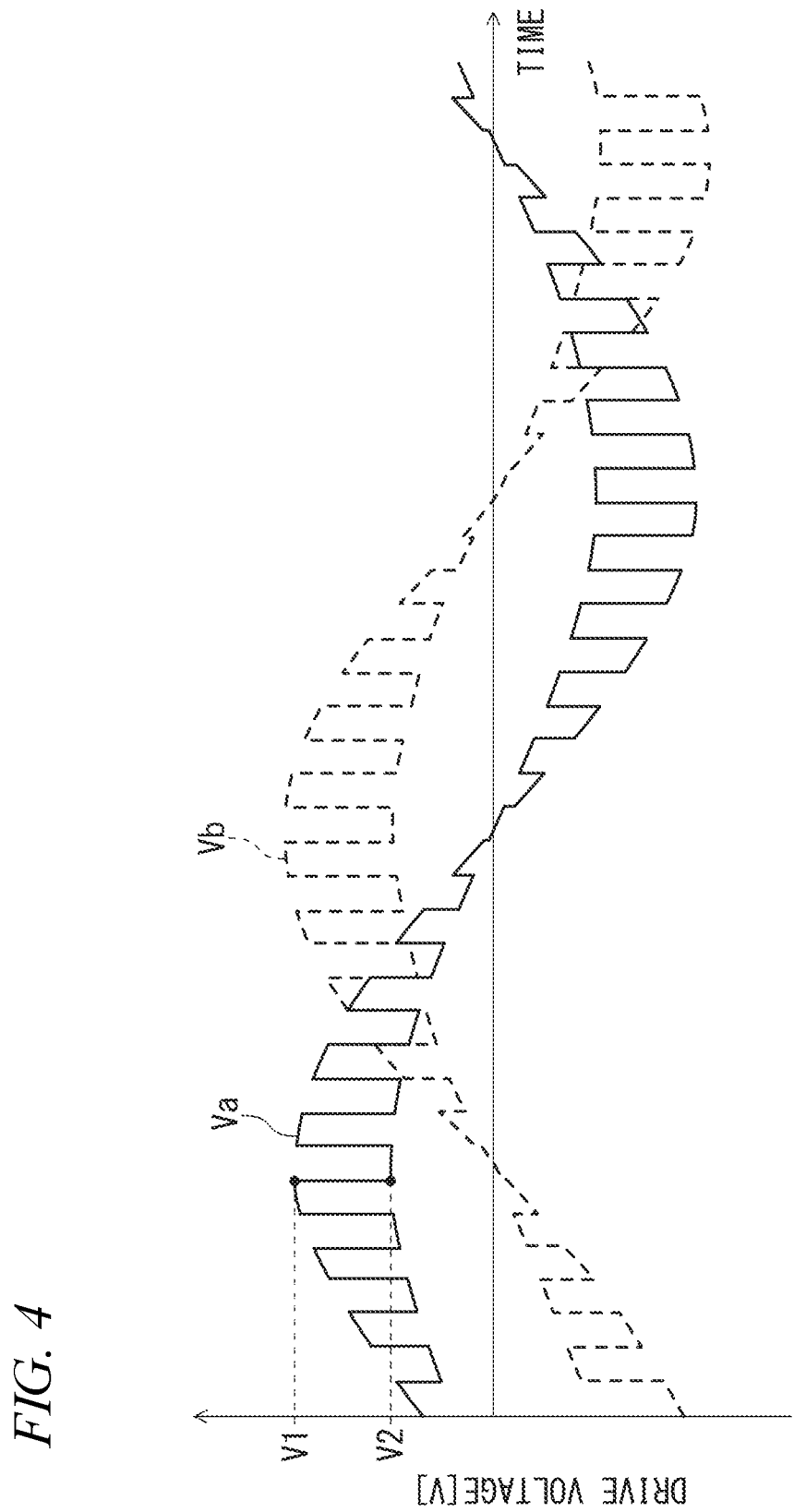
FIG. 4 is a waveform diagram of a decreased voltage according to the embodiment.

FIG. 4 is a waveform diagram of a decreased voltage according to the embodiment. In the graph, the vertical axis represents the drive voltage, and the horizontal axis represents the time.

The drive voltage Va is a pulse-modulated signal having a 50% duty of V1 and V2 in which a first sinusoidal wave having an amplitude V1 and a second sinusoidal wave having an amplitude V2, of which the phase is the same as that of the first sinusoidal wave, are alternated at every electric angle of 1.0 degree, has an instantaneous value that is the same as the rated voltage in the On period thereof (a period of a sinusoidal wave having the amplitude V1), and has a waveform having a predetermined ratio of the rated voltage in the Off period (a period of a sinusoidal wave having the amplitude V2). In addition, the drive voltage Vb is a pulse-modulated signal having a 50% duty of V1 and V2 in which a third sinusoidal wave having the amplitude V1 and a fourth sinusoidal wave having the amplitude V2, of which the phase is the same as that of the third sinusoidal wave, are alternated at every electric angle of 1.0 degree, has an instantaneous value that is the same as the rated voltage in the On period thereof (a period of a sinusoidal wave having the amplitude V1), and has a waveform having a predetermined ratio of the rated voltage in the Off period (a period of a sinusoidal wave having the amplitude V2). The phase of the first sinusoidal wave and the phase of the third sinusoidal wave deviate from each other by 90°. The phase of the second sinusoidal wave and the phase of the fourth sinusoidal wave deviate from each other by 90°.

Here, the sinusoidal wave having the amplitude V1 corresponds to the rated voltage of the motor 120, and the amplitude V2 is 50% of the amplitude V1. In addition, when the amplitude V1 and the amplitude V2 are the same, driving according to the rated voltage is performed.

For each of both the drive voltages Va and Vb, a zero cross of the rise of the voltage coincides with switching timing from a sinusoidal wave having the amplitude V2 into a sinusoidal wave having the amplitude V1. In addition, for each of both the drive voltages Va and Vb, a zero cross of the fall of the voltage coincides with switching timing from a sinusoidal wave having the amplitude V2 into a sinusoidal wave having the amplitude V1. Such pulse-modulated signals are called "synchronization signals". By performing control as such, the rise waveform and the fall waveform near the zero cross of each of the drive voltages Va and Vb are symmetrical with respect to a voltage of 0 V as its center line, and accordingly, an external disturbance of the torque can be minimized.

The decreased voltage applied when the drive controller 100 drives the stepping motor 120 to rotate at a constant speed in the sweeping operation is a signal acquired by decreasing the rated voltage at a predetermined ratio in a predetermined range of the electric angle of the stepping motor 120. The ratio η of the sinusoidal wave having the amplitude V2 to the sinusoidal wave "100" having the amplitude V1 is set in the range that exceeds −100 and is +100 or less and is preferably set to an optimal value according to the specification of the pointer 13 and the operation speed of the pointer 13. Here, in a case where the ratio η is negative, for example, while a phase difference between the first and second sinusoidal waves is 90 degrees in the electric angle, the phase difference becomes −90 degrees, and a case is assumed in which the torque according to the first sinusoidal wave and the torque according to the second sinusoidal wave are in the opposite directions. In other words, in a case where the ratio η is negative, it represents that reverse (brake) torque is generated at the time of the sinusoidal wave having the amplitude V2.

On the other hand, in a case where the ratio η is positive, when the drive voltage Va is switched to the sinusoidal wave having the amplitude V1, the drive voltage Vb is also switched to the sinusoidal wave having the amplitude V1. When the drive voltage Va is switched to the sinusoidal wave having the amplitude V2, the drive voltage Vb is also switched to the sinusoidal wave having the amplitude V2. In this way, since the amplitudes of the drive voltages of the A phase and the B phase are switched at electric angles having the same amplitude, the magnitude of the rotation magnetic field decreases, but the position of the magnetic field does not change. Accordingly, an increased/decreased speed of the rotor can be intentionally expected at this switching point.

A frequency f (Hz) used for pulse modulation of these drive voltages, in other words, a frequency at time of setting On/Off as one cycle is set to be higher than the resonant frequency of the motor 120 including the inertia of the pointer 13, be higher than 50 Hz, and be lower than 200 Hz. Here, when the amplitudes of the drive voltages Va and Vb are small in the analog manner, a speed external disturbance due to the resonant frequency of the motor 120 occurs. When this resonant frequency is 50 Hz or less, this external disturbance may be visually recognized by a human. However, in a case where the frequency of the speed external disturbance of the pointer 13 and the motor 120 is shifted, for example, to a range higher than 50 Hz by performing pulse modulation of these drive voltages using a frequency that is higher than the resonant frequency and is higher than 50 Hz, a human can be caused not to visually recognize the speed external disturbance of the pointer 13. The reason for this is that, generally, a human cannot recognize visual information having a frequency higher than 50 Hz.

On the other hand, in a case where the frequency of On/Off exceeds 200 Hz, while the speed external disturbance of the pointer 13 is not visually recognized by a human, this time, there is concern that an electromagnetic sound that is a harsh sound according to On/Off is heard by the human's ear. Accordingly, this On/Off frequency may be set to be higher than 50 Hz and lower than 200 Hz. By performing setting so as to satisfy such a condition, it is appropriate that a human cannot visually recognize the vibration of the pointer 13, and an electromagnetic sound of the motor 120 is not a harsh sound. In other words, according to this method, while the physical pulsation of the pointer is present, by combining the pulsation with the human's visual characteristic, an effect of allowing the pulsation to be visually recognized as if it is decreased can be expected.

More specifically, in the example illustrated in FIG. 4 (On: electric angle 9.0 degrees, Off: electric angle 9.0 degrees), in a case where the number of magnetic pole pairs is 9, in order to set the frequency f of On/Off to be higher than 50 Hz, the speed range of the pointer 13 may be set to be higher than 200 deg/s. On the other hand, in order to set the frequency f of On/Off to be lower than 200 Hz, the speed range of the pointer 13 may be set to be lower than 800 deg/s. As a technique for maintaining the frequency range of On/Off to be wide from 50 to 200 Hz, in accordance with the speed of the pointer 13, for example, by regulating the electric angle of On/Off to be wide in a case where the speed of the pointer 13 is high and, to the contrary, by regulating the electric angle of On/Off to be narrow in a case where the speed of the pointer 13 is low, the speed of the pointer 13 can be flexibly responded.

Figure 5:
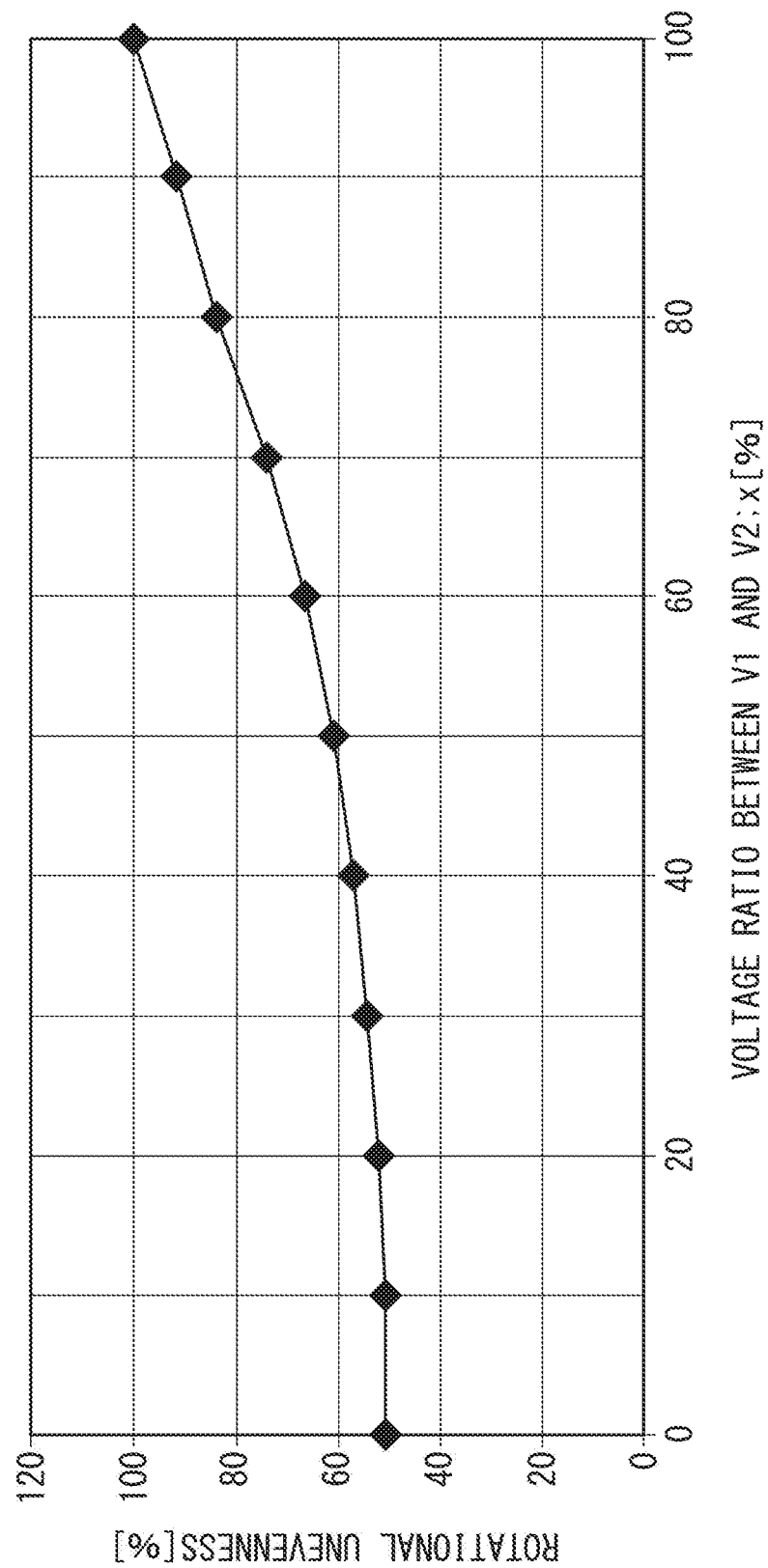
FIG. 5 is a graph (calculated value) that represents a relation between rotational unevenness and a voltage ratio of a decreased voltage.

FIG. 5 represents an exemplary graph that illustrates a relation between a rotational unevenness and a voltage ratio of the decreased voltage and is acquired based on calculated values.

This graph is acquired through a calculation made by forming rotational unevenness of a case where the voltage ratio x between the amplitude V1 and the amplitude V2 is changed as a physical calculation equation by using a motor 120 ($\delta=0.555°$) having a linearity error as the reference. In the graph, the vertical axis represents the rotational unevenness as a percentage, and the horizontal axis represents a voltage ratio x between the amplitude V1 and the amplitude V2 as a percentage. Regarding the pulse modulation period, a frequency that is ten times the frequency of the drive voltage of the motor 120 is set. In other words, the electric angle of On is 4.5 degrees, and the electric angle of Off is 4.5 degrees.

The value of the rotational unevenness when the voltage ratio x between the amplitude V1 and the amplitude V2 is 100% is set as 100%.

At the time of a decreased voltage acquired by decreasing the voltage ratio x between the amplitude V1 and the amplitude V2 to 50%, the rotational unevenness decreases to about 60%. In addition, at the time of a decreased voltage acquired by further decreasing the voltage ratio x to 0%, the rotational unevenness decreases to about 50%. The effective value of the drive voltage at this time is 70.7% of the rated voltage. In a case where the voltage is decreased in an analog manner, it is assumed that the same effect can be expected by setting the amplitude of the drive voltage to have a magnitude of 70.7% of the rated voltage.

In a sweeping operation, the drive controller 100 according to the embodiment drives the motor 120 by inputting the rated voltage thereto during the acceleration period and the deceleration period and drives the motor 120 by inputting a decreased voltage lower than the rated voltage to the motor 120 during the constant-speed period. According to such a system, the generation of pulsation of the operation of the pointer 13 at the time of performing the sweeping operation can be suppressed, and the driver is not caused to feel discomfort.

The drive controller 100 according to the embodiment can avoid the generation of excessive torque in the constant-speed period, and accordingly, a torque ripple of the motor 120 based on a linearity error of the motor 120 or the like can be suppressed. Accordingly, the generation of pulsation in the operation of the pointer 13 can be suppressed.

The drive controller 100 according to the embodiment can avoid the generation of excessive torque in the constant-speed period. Accordingly, the generation of pulsation in the operation of the pointer 13 can be suppressed. By suppressing the pulsation of the pointer 13, an allowed value of the linearity error of the motor 120 can be increased. In other words, in the manufacturing process of the motor 120, an allowed range of the linearity error can be increased, and accordingly, the yield rate of the production of the motor 120 can be improved.

The present invention is not limited to the embodiment described above but may be changed in a range not departing from the concept of the present invention, and, for example, there are the following modifications (a) to (e).

(a) In the embodiment described above, while the description is presented based on the micro step driving of a multilayer-type two-phase stepping motor, the present invention can be similarly applied to a claw pole-type stepping motor as well. In addition, the number of rotor magnetic poles is not fixed to two, and the number of phases is not limited to two.

(b) In the embodiment described above, while the description is presented based on the micro step driving according to voltage control, current control may be used. In such a case, in the constant-speed period, the motor may be driven using a decreased current that is lower than the current used at the time of performing a normal operation. In addition, by configuring the waveform of the current as a sinusoidal wave, the torque waveform can be further uniformized compared to the case of voltage driving.

(c) In the embodiment described above, the pulse modulation system, the pulse period, and the duty are examples, and the present invention is not limited thereto.

(d) In the embodiment described above, while the vehicle tachometer has been described, the drive controller according to the present invention can be applied to a vehicle speedometer or any other instrument.

(e) In the embodiment described above, the decreased voltage is configured to be lower than the rated voltage using a method of uniformly decreasing instantaneous values of the rated voltage of the whole range of the electric angle of the stepping motor at a predetermined ratio in an analog manner or a pulse modulation method. However, the present invention is not limited thereto, but the drive controller may generate a decreased voltage by decreasing the instantaneous values of the voltage only for a predetermined range of the electric angle of the stepping motor so as to have regularity for each repetition of the drive voltage in an analog manner or by using pulse modulation. For example, a method may be used in which the instantaneous values of the section of the electric angle of 45 to 135 degrees and the section of the electric angle of 225 to 315 degrees are decreased. In other words, the drive controller may generate a decreased voltage by using a method of decreasing the rated voltage at a predetermined ratio in a predetermined range of the electric angle of the stepping motor. In this way, the motor can be appropriately driven to rotate by avoiding only a part that can be easily influenced by the torque pulsation of torque generated by regularly deviating from a sinusoidal wave or the like, like in the case of magnetic saturation, an external disturbance that regularly occurs, and the like.

As described in the above with reference to the embodiment and modified examples, according to the present invention, a drive controller of an instrument that does not cause a driver, an operator, or the like to feel discomfort in accordance with the motion of a pointer in a sweeping operation can be provided.

What is claimed is:

1. A drive controller of an instrument that controls a stepping motor to rotate a pointer of the instrument attached to a rotation shaft of the stepping motor, the pointer rotatable between a zero scale position and a maximum scale position,
wherein the drive controller controls the stepping motor to perform a sweeping operation in which the pointer is swung from the zero scale position to the maximum scale position and returned back to the zero scale position,
wherein the drive controller controls the stepping motor, during the sweeping operation, to accelerate to a predetermined speed by outputting a rated torque signal to the stepping motor and controls the stepping motor to rotate at the predetermined speed by outputting a decreased torque signal to the stepping motor, the decreased torque signal being lower than the rated torque signal, and
wherein the drive controller outputs a pulse-modulated signal as the decreased torque signal, the pulse-modulated signal having a modulation frequency that is higher than 50 Hz and a resonant frequency of the stepping motor including inertia of the pointer and is lower than 200 Hz.

2. The drive controller according to claim 1,
wherein the drive controller generates the pulse-modulated signal by repetitively alternating the rated torque signal and a signal having a predetermined ratio of the rated torque signal and outputs the pulse-modulated signal as the decreased torque signal.

3. The drive controller according to claim 2,
wherein the drive controller generates the pulse-modulated signal having a zero cross at a rise coincides with switching timing from one of the rated torque signal and the signal having the predetermined ratio of the rated torque signal to the other, and having a zero cross at a fall coincides with switching timing from the other of the rated torque signal and the signal that is the predetermined ratio of the rated torque signal to the one.

4. The drive controller according to claim 3,
wherein the drive controller generates the pulse-modulated signal including 50% duty of the rated torque signal and 50% duty of the signal having the predetermined ratio of the rated torque signal.

5. The drive controller according to claim 1,
wherein the drive controller outputs an analog signal as the decreased torque signal, the analog signal being lower than the rated torque signal.

6. The drive controller according to claim 1,
wherein the drive controller outputs a voltage signal or a current signal as the decreased torque signal.

7. The drive controller according to claim 1,
wherein the drive controller controls the stepping motor, during the sweeping operation, to rotate at the predetermined speed after accelerating the stepping motor to the predetermined speed and to decelerate the stepping motor by outputting the rated torque signal to the stepping motor to stop the pointer at the maximum scale position.

8. A drive controller of an instrument that controls a stepping motor to rotate a pointer of the instrument attached to a rotation shaft of the stepping motor, the pointer rotatable between a zero scale position and a maximum scale position,
wherein the drive controller controls the stepping motor to perform a sweeping operation in which the pointer is swung from the zero scale position to the maximum scale position and returned back to the zero scale position,
wherein the drive controller controls the stepping motor, during the sweeping operation, to accelerate to a predetermined speed by outputting a rated torque signal to the stepping motor and controls the stepping motor to rotate at the predetermined speed by outputting a decreased torque signal to the stepping motor, the decreased torque signal being lower than the rated torque signal, and
wherein the drive controller generates the decreased torque signal by decreasing the rated torque signal by a predetermined ratio in a predetermined range of an electric angle of the stepping motor.

9. The drive controller according to claim 8,
wherein the drive controller outputs an analog signal as the decreased torque signal, the analog signal being lower than the rated torque signal.

10. The drive controller according to claim 8,
wherein the drive controller controls the stepping motor, during the sweeping operation, to rotate at the predetermined speed after accelerating the stepping motor to the predetermined speed and to decelerate the stepping motor by outputting the rated torque signal to the stepping motor to stop the pointer at the maximum scale position.

11. The drive controller according to claim 8, wherein the drive controller outputs a pulse-modulated signal as the decreased torque signal, the pulse-modulated signal having a modulation frequency that is higher than 50 Hz and a resonant frequency of the stepping motor including inertia of the pointer and is lower than 200 Hz.

12. The drive controller according to claim 11, wherein the drive controller generates the pulse-modulated signal by repetitively alternating the rated torque signal and a signal having a predetermined ratio of the rated torque signal and outputs the pulse-modulated signal as the decreased torque signal.

13. The drive controller according to claim 11, wherein the drive controller outputs a voltage signal or a current signal as the decreased torque signal.

14. The drive controller according to claim 8, wherein the drive controller outputs a voltage signal or a current signal as the decreased torque signal.

15. A drive controller of an instrument that controls a stepping motor to rotate a pointer of the instrument attached to a rotation shaft of the stepping motor, the pointer rotatable between a zero scale position and a maximum scale position,
wherein the drive controller controls the stepping motor to perform a sweeping operation in which the pointer is swung from the zero scale position to the maximum scale position and returned back to the zero scale position,
wherein the drive controller controls the stepping motor, during the sweeping operation, to accelerate to a predetermined speed by outputting a rated torque signal to the stepping motor and controls the stepping motor to rotate at the predetermined speed by outputting a decreased torque signal to the stepping motor, the decreased torque signal being lower than the rated torque signal, and
wherein the drive controller controls the stepping motor, during the sweeping operation, to rotate at the predetermined speed after accelerating the stepping motor to the predetermined speed and to decelerate the stepping motor by outputting the rated torque signal to the stepping motor to stop the pointer at the maximum scale position.

16. The drive controller according to claim 15, wherein the drive controller outputs an analog signal as the decreased torque signal, the analog signal being lower than the rated torque signal.

17. The drive controller according to claim 15, wherein the drive controller outputs a pulse-modulated signal as the decreased torque signal, the pulse-modulated signal having a modulation frequency that is higher than 50 Hz and a resonant frequency of the stepping motor including inertia of the pointer and is lower than 200 Hz.

18. The drive controller according to claim 17, wherein the drive controller generates the pulse-modulated signal by repetitively alternating the rated torque signal and a signal having a predetermined ratio of the rated torque signal and outputs the pulse-modulated signal as the decreased torque signal.

* * * * *